(12) United States Patent
Nakamoto

(10) Patent No.: US 8,270,843 B2
(45) Date of Patent: Sep. 18, 2012

(54) OPTICAL TRANSMISSION SYSTEM

(75) Inventor: Hiroshi Nakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 792 days.

(21) Appl. No.: 12/289,531

(22) Filed: Oct. 29, 2008

(65) Prior Publication Data

US 2009/0245809 A1    Oct. 1, 2009

(30) Foreign Application Priority Data

Mar. 27, 2008   (JP) .................................. 2008-082310

(51) Int. Cl.
   *H04B 10/00* (2006.01)
(52) U.S. Cl. ......... 398/159; 398/193; 398/194; 398/208
(58) Field of Classification Search .................. 398/140, 398/147–150, 158–159, 182, 193–194
   See application file for complete search history.

(56) References Cited

U.S. PATENT DOCUMENTS

| | | | | |
|---|---|---|---|---|
| 5,877,881 | A * | 3/1999 | Miyauchi et al. ............. | 398/193 |
| 6,574,389 | B1 * | 6/2003 | Schemmann et al. ......... | 385/24 |
| 6,580,535 | B1 * | 6/2003 | Schonfelder .................. | 398/65 |
| 6,871,024 | B2 * | 3/2005 | Nishimoto et al. ........... | 398/159 |
| 6,934,479 | B2 | 8/2005 | Sakamoto et al. | |
| 7,194,210 | B2 * | 3/2007 | Uda et al. ...................... | 398/159 |
| 7,386,240 | B2 * | 6/2008 | Thomson et al. ............. | 398/193 |
| 7,653,310 | B2 * | 1/2010 | Sekine ............................ | 398/81 |
| 7,880,649 | B2 * | 2/2011 | Asami ............................ | 341/118 |
| 2003/0016721 | A1 * | 1/2003 | Naganuma et al. ............. | 372/97 |
| 2003/0081292 | A1 | 5/2003 | Mikami et al. | |
| 2003/0090768 | A1 * | 5/2003 | Liu et al. ....................... | 359/183 |
| 2003/0113117 | A1 * | 6/2003 | Taneda ........................... | 398/79 |
| 2004/0067064 | A1 * | 4/2004 | McNicol et al. .............. | 398/158 |
| 2004/0197103 | A1 * | 10/2004 | Roberts et al. ................ | 398/159 |

(Continued)

FOREIGN PATENT DOCUMENTS

EP       0 700 178 A2      3/1996

(Continued)

OTHER PUBLICATIONS

Moon H et al., "FPGA-Based Adaptive Digital Predistortion for Radio-Over-Fiber-Links" Microprocessors and Microsystems, IPC Business Press LTD., London, GB, vol. 30, No. 3, May 5, 2006, pp. 145-154.

(Continued)

*Primary Examiner* — Nathan Curs
*Assistant Examiner* — Tanya Ngo
(74) *Attorney, Agent, or Firm* — Staas & Halsey LLP

(57) ABSTRACT

An optical transmission system capable of efficiently reducing waveform distortion of an optical signal. A transmitting-side distortion compensation coefficient storage of a transmitting station stores transmitting-side distortion compensation coefficients for compensating for waveform distortion of an optical signal to be transmitted to a receiving station. A transmit signal processor performs distortion compensation on the optical signal on the basis of a suitable transmitting-side distortion compensation coefficient stored in the transmitting-side distortion compensation coefficient storage. A transmitter transmits the distortion-compensated signal to a transmission path. A receiver of the receiving station receives the optical signal from the transmission path. A receiving-side distortion compensation coefficient storage stores receiving-side distortion compensation coefficients for compensating for waveform distortion of the optical signal received by the receiver. A received signal processor performs distortion compensation on the received optical signal on the basis of a suitable receiving-side distortion compensation coefficient.

8 Claims, 11 Drawing Sheets

U.S. PATENT DOCUMENTS

| | | | |
|---|---|---|---|
| 2005/0047802 A1 | 3/2005 | Jaynes et al. | |
| 2005/0185964 A1 | 8/2005 | Ishikawa | |
| 2005/0226631 A1 | 10/2005 | Thomson et al. | |
| 2005/0238362 A1* | 10/2005 | Sekiya et al. | 398/147 |
| 2009/0175629 A1* | 7/2009 | Liu et al. | 398/147 |
| 2009/0317078 A1* | 12/2009 | Uda et al. | 398/29 |

FOREIGN PATENT DOCUMENTS

| | | |
|---|---|---|
| EP | 1 855 399 A1 | 11/2007 |
| JP | 2006-174073 | 6/2006 |
| JP | 2009-188788 | 8/2009 |
| WO | WO2004/088883 | 10/2004 |

OTHER PUBLICATIONS

European Search Report mailed Jun. 30, 2009 and issued in corresponding European Patent Application 08168230.4.

M.S. O'Sullivan et al., "Electronic Dispersion Compensation Techniques for Optical Communication Systems", ECOC 2006, Tu3.2.1 (2 pages).

Argrawal, "Nonlinear Fiber Optics", 2nd Ed., pp. 29-55, see particularly p. 45.

Timo Pfau et al., 1.6 Gbit/s Real Time Synchronous QPSK Transmission with Standard DFB Lasers:, ECOS 2006, Mo4.2.6 (2 pages).

Patent Abstracts of Japan for Publication No. 2003-258726 published Sep. 12, 2003.

Patent Abstracts of Japan for Publication No. 2005-311721 published Nov. 4, 2005.

Patent Abstracts of Japan for Publication No. 2002-057624 published Feb. 22, 2002.

Patent Abstracts of Japan, Publication No. 2006-174073, Published Jun. 29, 2006.

Patent Abstracts of Japan, Publication No. 2009-188788, Published Aug. 20, 2009.

Lakshmi P. Baskaran et al., "Transmitter Pre-emphasis and Adaptive Receiver Equalization for Duobinary Signaling in Backplane Channels", Electrical Engineering Program, Penn State University at Harrisburg, Middletown, PA, 0752228, 272497, I-4244-0763-X/07, Apr. 24, 2007 IEEE, pp. 2-3.

Henning Biilow et al., "Electronic Dispersion Compensation", Journal of Lightwave Technology, vol. 26, No. 1, Jan. 1, 2008 (0752228, 272496), 0733-8724, pp. 2-11.

Japanese Patent Office Action issued in Japanese Patent Application No. 2008-082310 dated Apr. 24, 2012.

* cited by examiner

14 COMPENSATION INFO TABLE

| COMPENSATION RATIO | OPTICAL POWER | | SIGNAL | 1 | 2 | 3 | 4 | ... | 23 | 24 |
|---|---|---|---|---|---|---|---|---|---|---|
| 70:30 | Nominal 100% | AMPLITUDE COMPENSATION DATA | 000 | a1,1,1,1 | a1,1,1,2 | a1,1,1,3 | a1,1,1,4 | ... | a1,1,1,23 | a1,1,1,24 |
| | | | 001 | a1,1,2,1 | a1,1,2,2 | a1,1,2,3 | a1,1,2,4 | ... | a1,1,2,23 | a1,1,2,24 |
| | | | ... | ... | ... | ... | ... | ... | ... | ... |
| | | | 111 | a1,1,7,1 | a1,1,7,2 | a1,1,7,3 | a1,1,7,4 | ... | a1,1,7,23 | a1,1,7,24 |
| | | PHASE COMPENSATION DATA | 000 | b1,1,1,1 | b1,1,1,2 | b1,1,1,3 | b1,1,1,4 | ... | b1,1,1,23 | b1,1,1,24 |
| | | | 001 | b1,1,2,1 | b1,1,2,2 | b1,1,2,3 | b1,1,2,4 | ... | b1,1,2,23 | b1,1,2,24 |
| | | | ... | ... | ... | ... | ... | ... | ... | ... |
| | | | 111 | b1,1,7,1 | b1,1,7,2 | b1,1,7,3 | b1,1,7,4 | ... | b1,1,7,23 | b1,1,7,24 |
| 70:30 | Nominal 105% | AMPLITUDE COMPENSATION DATA | 000 | a1,2,1,1 | a1,2,1,2 | a1,2,1,3 | a1,2,1,4 | ... | a1,2,1,23 | a1,2,1,24 |
| | | | 001 | a1,2,2,1 | a1,2,2,2 | a1,2,2,3 | a1,2,2,4 | ... | a1,2,2,23 | a1,2,2,24 |
| | | | ... | ... | ... | ... | ... | ... | ... | ... |
| | | | 111 | a1,2,7,1 | a1,2,7,2 | a1,2,7,3 | a1,2,7,4 | ... | a1,2,7,23 | a1,2,7,24 |
| | | PHASE COMPENSATION DATA | 000 | b1,2,1,1 | b1,2,1,2 | b1,2,1,3 | b1,2,1,4 | ... | b1,2,1,23 | b1,2,1,24 |
| | | | 001 | b1,2,2,1 | b1,2,2,2 | b1,2,2,3 | b1,2,2,4 | ... | b1,2,2,23 | b1,2,2,24 |
| | | | ... | ... | ... | ... | ... | ... | ... | ... |
| | | | 111 | b1,2,7,1 | b1,2,7,2 | b1,2,7,3 | b1,2,7,4 | ... | b1,2,7,23 | b1,2,7,24 |

FIG. 5

24 COMPENSATION INFO TABLE

| COMPENSATION RATIO | OPTICAL POWER | SIGNAL | | 1 | 2 | 3 | 4 | ... | 23 | 24 |
|---|---|---|---|---|---|---|---|---|---|---|
| 70:30 | Nominal 100% | 000 | AMPLI-TUDE COMPEN-SATION DATA | m1,1,1,1 | m1,1,1,2 | m1,1,1,3 | m1,1,1,4 | ... | m1,1,1,23 | m1,1,1,24 |
| | | 001 | | m1,1,2,1 | m1,1,2,2 | m1,1,2,3 | m1,1,2,4 | ... | m1,1,2,23 | m1,1,2,24 |
| | | ... | | ... | ... | ... | ... | ... | ... | ... |
| | | 111 | | m1,1,7,1 | m1,1,7,2 | m1,1,7,3 | m1,1,7,4 | ... | m1,1,7,23 | m1,1,7,24 |
| | | 000 | PHASE COMPEN-SATION DATA | n1,1,1,1 | n1,1,1,2 | n1,1,1,3 | n1,1,1,4 | ... | n1,1,1,23 | n1,1,1,24 |
| | | 001 | | n1,1,2,1 | n1,1,2,2 | n1,1,2,3 | n1,1,2,4 | ... | n1,1,2,23 | n1,1,2,24 |
| | | ... | | ... | ... | ... | ... | ... | ... | ... |
| | | 111 | | n1,1,7,1 | n1,1,7,2 | n1,1,7,3 | n1,1,7,4 | ... | n1,1,7,23 | n1,1,7,24 |
| 70:30 | Nominal 105% | 000 | AMPLI-TUDE COMPEN-SATION DATA | m1,2,1,1 | m1,2,1,2 | m1,2,1,3 | m1,2,1,4 | ... | m1,2,1,23 | m1,2,1,24 |
| | | 001 | | m1,2,2,1 | m1,2,2,2 | m1,2,2,3 | m1,2,2,4 | ... | m1,2,2,23 | m1,2,2,24 |
| | | ... | | ... | ... | ... | ... | ... | ... | ... |
| | | 111 | | m1,2,7,1 | m1,2,7,2 | m1,2,7,3 | m1,2,7,4 | ... | m1,2,7,23 | m1,2,7,24 |
| | | 000 | PHASE COMPEN-SATION DATA | n1,2,1,1 | n1,2,1,2 | n1,2,1,3 | n1,2,1,4 | ... | n1,2,1,23 | n1,2,1,24 |
| | | 001 | | n1,2,2,1 | n1,2,2,2 | n1,2,2,3 | n1,2,2,4 | ... | n1,2,2,23 | n1,2,2,24 |
| | | ... | | ... | ... | ... | ... | ... | ... | ... |
| | | 111 | | n1,2,7,1 | n1,2,7,2 | n1,2,7,3 | n1,2,7,4 | ... | n1,2,7,23 | n1,2,7,24 |

FIG. 7

OPTICAL TRANSMISSION SYSTEM

CROSS-REFERENCE TO RELATED APPLICATIONS

This application is based upon and claims the benefits of priority from the prior Japanese Patent Application No. 2008-082310, filed on Mar. 27, 2008, the entire contents of which are incorporated herein by reference.

BACKGROUND

1. Field

The present invention relates to optical transmission systems, and more particularly, to an optical transmission system for compensating for waveform distortion of optical signals.

2. Description of the Related Art

In optical communication systems using optical fibers as transmission paths, waveform distortion occurs due to chromatic dispersion, and therefore, design of chromatic dispersion is of great importance. If the amount of chromatic dispersion is too large, optical signal waveforms are distorted under the influence of spectral spread attributable to SPM (Self Phase Modulation), degrading the signal quality. If the dispersion is too small, on the other hand, significant interference of waveforms occurs during the wavelength division multiplex transmission due to crosstalk attributable to FWM (Four Wave Mixing) and also due to XPM (Cross Phase Modulation) of adjacent channels, leading to degradation of the signal quality. Accordingly, transmission paths are usually made to have a dispersion of about 2 ps/nm/km so that when the dispersion accumulates to about several hundred ps/nm, the cumulative dispersion may be compensated.

A maximum number of WDM (Wavelength Division Multiplexing) channels is restricted by the OSNR (Optical Signal to Noise Ratio), which is determined by the characteristics of optical repeaters and the loss of optical fibers, and also by signal degradation caused within the transmission paths. Signal degradation is caused typically by fiber nonlinear SPM and GVD (Group Velocity Dispersion) (SPM-GVD). In designing novel systems, it is necessary that degradation attributable to SPM-GVD be lessened in order to increase the number of channels. Also, in the case of upgrading existing systems that are already providing services, degradation attributable to SPM-GVD needs to be reduced to maximize the number of available channels. The state of such nonlinear degradation changes because optical power per channel varies with increase/decrease in the number of channels in service.

As techniques for compensating for the chromatic dispersion of optical fibers, there have been known, besides optical compensation methods, electronic compensation methods for electrically compensating for distortion of optical signal waveforms. Electronic compensation methods include: 1. method in which signal waveforms are directly detected and bandwidth equalization is performed on the waveforms of the received electrical signal; and 2. method in which waveform distortion caused within a transmission path is compensated through amplitude modulation and phase modulation. The latter method utilizes information on the phase of optical signal and therefore can compensate for dispersion with an accuracy about ten times as high as that achieved by the former method.

As an example of the latter method, a technique is known in which compensating modulation is carried out at the signal transmitting device (transmitting station) (see, e.g., PCT-based Unexamined Japanese Patent Publication No. 2006-522508 filed by Nortel Networks Limited, and "Electronic Dispersion Compensation Tourniquets for Optical Communications Systems", ECOC 2006 Tu3.2.1). For example, assuming that the transmit signal is E(t), the waveform C[E(t)] of the received signal can be obtained by transmission simulation. The transmission simulation can be implemented, for example, by solving the nonlinear Schrodinger equation by the split-step Fourier method (see, e.g., "Nonlinear Fiber Optics" by Agrawal, 2nd edition, p. 45). C[] can be obtained from parameters including the transmit signal waveform, the optical power (transmit optical power, optical power on the transmission path), the amount of dispersion, the nonlinear optical constant of the optical fiber, and the system length. Also, C[] is a complex function and carries information on both amplitude and phase.

If C[E(t)] can be obtained as the received signal, then it is possible to derive $C^{-1}[]$. The transmitting station applies $C^{-1}[]$ to the transmit signal E(t) to subject the signal to the waveform conversion $C^{-1}[E(t)]$ and transmits the resulting signal, and since $C[C^{-1}[E(t)]]=E(t)$, the receiving device (receiving station) can derive the original signal waveform without the need for dispersion compensation.

A technique is also known in which compensating modulation is performed at the receiving station (see, e.g., "1.6 Gbit/s Real-Time Synchronous QPSK Transmission with Standard DFB Lasers" by the University of Paderborn, ECOC 2006 Mo4.2.6). Provided that the transmit signal is E(t), for example, the waveform C[E(t)] of the received signal can be obtained in advance by the transmission simulation. Thus, by applying $C^{-1}[]$ to the received signal at the receiving station, it is possible to obtain the original signal waveform because $C^{-1}[C[E(t)]]=E(t)$.

Where distortion is compensated only at one of the transmitting and receiving stations, however, the amount of compensation occasionally becomes large, giving rise to a problem that the waveform distortion cannot be significantly reduced.

SUMMARY

The present invention was created in view of the above circumstances, and an object thereof is to provide an optical transmission system capable of efficiently reducing waveform distortion.

To achieve the object, there is provided an optical transmission system for transmitting a wavelength division-multiplexed optical signal. The optical transmission system comprises a transmitting station and a receiving station. The transmitting station includes a transmitting-side distortion compensation coefficient storage storing a transmitting-side distortion compensation coefficient for compensating for a waveform distortion of the optical signal, a transmit signal processor for performing distortion compensation on the optical signal based on the transmitting-side distortion compensation coefficient, and a transmitter for outputting, to a transmission path, the optical signal on which the distortion compensation has been performed by the transmit signal processor. The receiving station includes a receiver for receiving the optical signal from the transmission path, a receiving-side distortion compensation coefficient storage storing a receiving-side distortion compensation coefficient for compensating for a waveform distortion of the optical signal received by the receiver, and a received signal processor for performing distortion compensation on the optical signal received by the receiver, based on the receiving-side distortion compensation coefficient.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 shows an exemplary data structure of a compensation information table in a transmitting station.

FIG. 7 shows an exemplary data structure of a compensation information table in a receiving station.

DESCRIPTION OF THE PREFERRED EMBODIMENTS

First, the principle of the present invention will be explained in detail.

Figure 1:
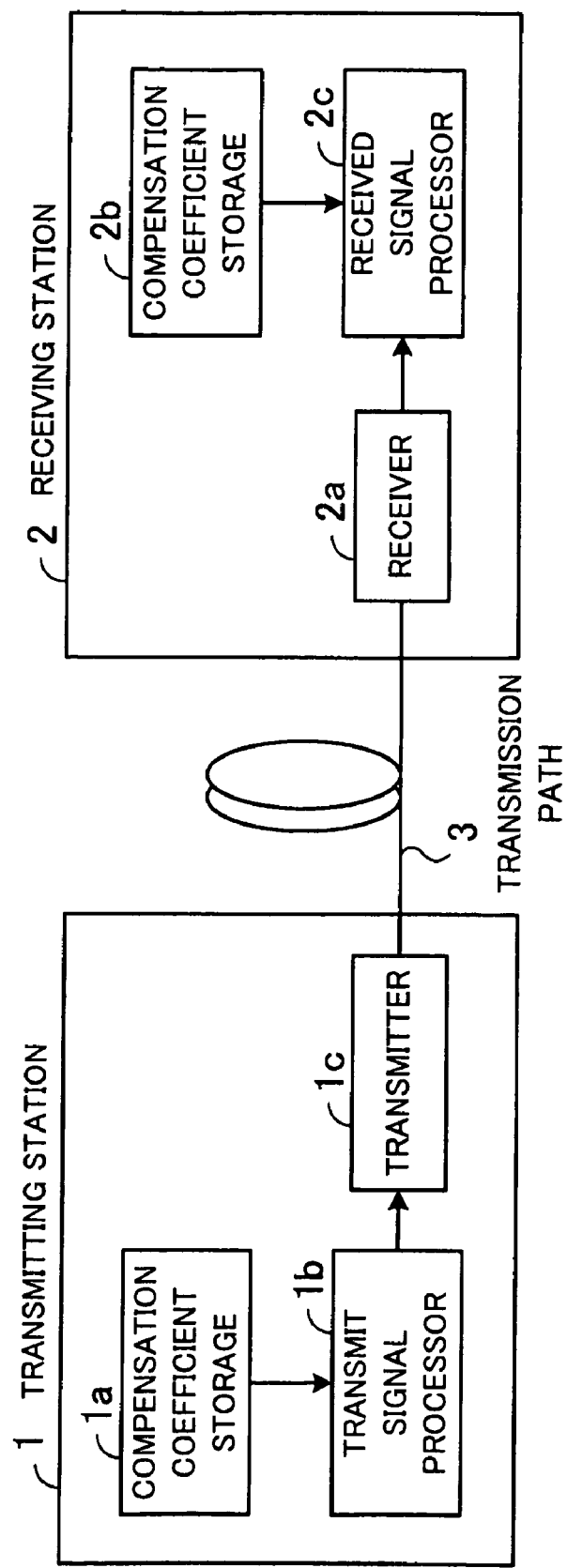
FIG. 1 schematically illustrates an optical transmission system.

FIG. 1 schematically illustrates an optical transmission system. As illustrated, the optical transmission system comprises a transmitting station 1, a receiving station 2, and a transmission path 3.

The transmitting station 1 includes a transmitting-side distortion compensation coefficient storage 1a, a transmit signal processor 1b, and a transmitter 1c.

The transmitting-side distortion compensation coefficient storage 1a stores transmitting-side distortion compensation coefficients for compensating for waveform distortion of an optical signal transmitted from the transmitting station 1 to the receiving station 2.

The transmit signal processor 1b performs distortion compensation on the optical signal based on a transmitting-side distortion compensation coefficient stored in the transmitting-side distortion compensation coefficient storage 1a.

The transmitter 1c outputs, to the transmission path 3, the optical signal to which the transmitting-side distortion compensation coefficient has been applied by the transmit signal processor 1b.

The receiving station 2 includes a receiver 2a, a receiving-side distortion compensation coefficient storage 2b, and a received signal processor 2c.

The receiver 2a receives the optical signal from the transmission path 3.

The receiving-side distortion compensation coefficient storage 2b stores receiving-side distortion compensation coefficients for compensating for waveform distortion of the optical signal received by the receiver 2a.

The received signal processor 2c performs distortion compensation on the optical signal received by the receiver 2a, based on a receiving-side distortion compensation coefficient stored in the receiving-side distortion compensation coefficient storage 2b.

Thus, in the optical transmission system of FIG. 1, waveform distortion of the transmitted optical signal is complementarily compensated at the transmitting and receiving stations 1 and 2. Since the amount of compensation for waveform distortion of the optical signal can be shared between the transmitting and receiving stations 1 and 2, the waveform distortion can be efficiently reduced.

A first embodiment of the present invention will be now described in detail with reference to the drawings.

Figure 2:
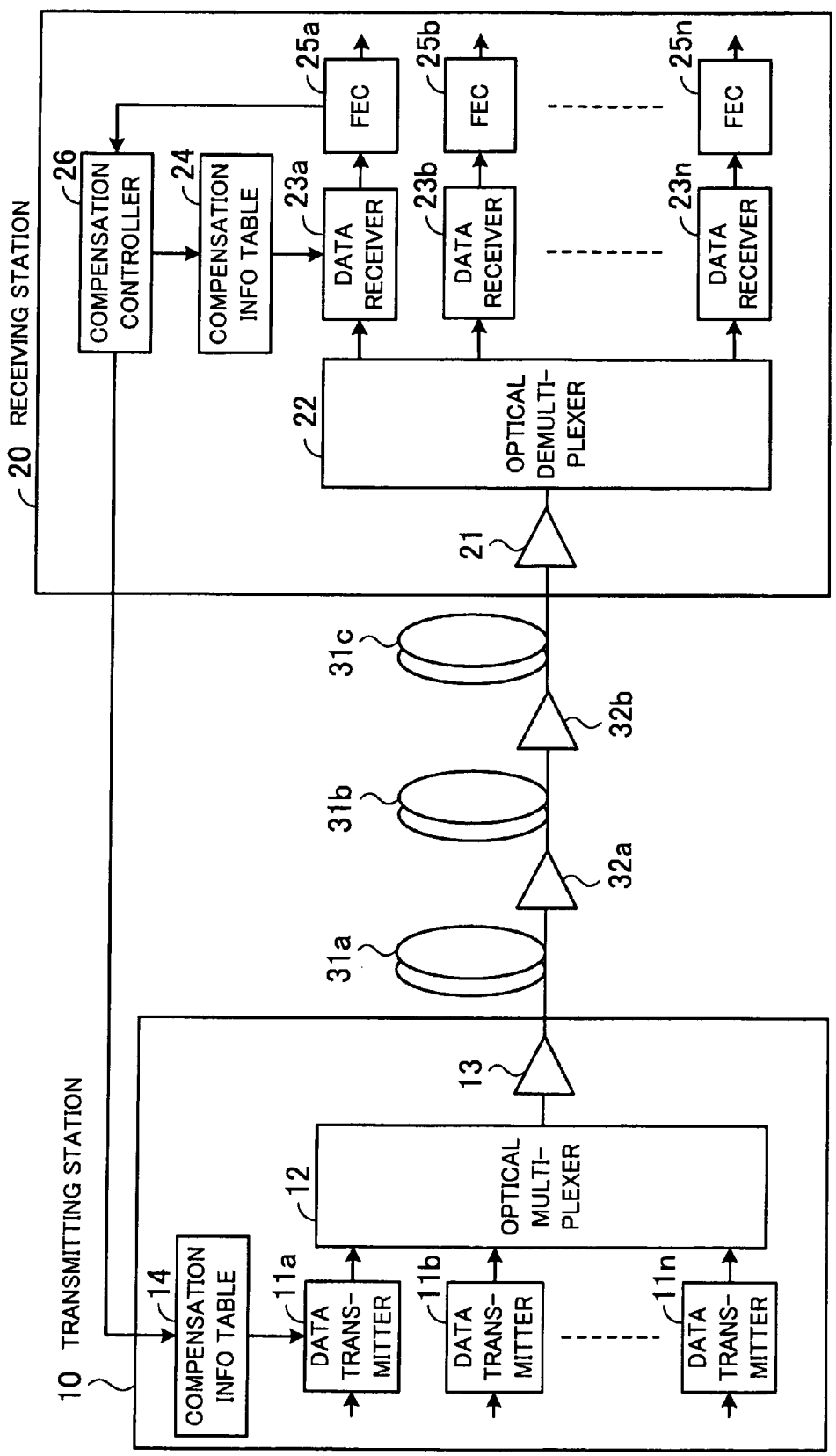
FIG. 2 illustrates an optical transmission system according to a first embodiment.

FIG. 2 illustrates an optical transmission system according to the first embodiment. In FIG. 2, a transmitting station 10 transmits an optical signal, and a receiving station 20 receives the optical signal. The transmitting and receiving stations 10 and 20 are connected to each other by optical fibers 31a, 31b and 31c and repeaters 32a and 32b.

The transmitting and receiving stations 10 and 20 share in the compensation for SPM-GVD induced distortion caused on the transmission path constituted by the optical fibers 31a, 31b and 31c and the repeaters 32a and 32b. For example, the transmitting station 10 performs distortion compensation covering 70% of the transmission path, and the receiving station 20 performs distortion compensation covering the remaining 30%.

The share ratio of dispersion compensation is adjusted by looking up the quality of the signal received by the receiving station 20. This is because in the case of a transmission path with large nonlinear degradation, the signal quality can be effectively improved by decreasing the amount of dispersion compensation performed at the transmitting side and thereby reducing the dispersion compensation-induced distortion of the signal waveform prior to transmission over the transmission path. Also, when the system is upgraded to increase the number of channels, for example, there is a possibility that the optical power per signal changes, possibly making it necessary to change the compensation sharing ratio between the transmitting and receiving stations 10 and 20.

For example, when the transmitting and receiving stations 10 and 20 are installed or when the system is upgraded, the share ratio of dispersion compensation between the transmitting and receiving stations 10 and 20 is determined in the manner described below. The share ratio of dispersion compensation between the transmitting and receiving stations 10 and 20 is successively varied to different ratios and is fixed to that share ratio with which the received signal shows the best quality.

The transmitting station 10 includes data transmitters 11a, 11b, . . . , 11n, an optical multiplexer 12, an optical amplifier 13, and a compensation information table 14.

The data transmitters 11a, 11b, . . . , 11n are each input with an electrical signal to be transmitted to the receiving station 20. Each of the data transmitters 11a, 11b, . . . , 11n converts the input electrical signal to an optical signal and outputs the signal obtained to the optical multiplexer 12.

When converting the electrical signal to an optical signal, the data transmitter 11a performs distortion compensation (SPM-GVD compensation). The compensation information table 14 stores in advance compensation coefficients ($C^{-1}[\,]$) for compensating for distortion of the optical signal. Using an appropriate compensation coefficient stored in the compensation information table 14, the data transmitter 11a performs distortion compensation on the transmit signal to be transmitted.

The optical multiplexer 12 subjects the optical signals of respective channels output from the data transmitters 11a, 11b, . . . , 11n to wavelength division multiplexing, and outputs the multiplexed optical signal to the optical amplifier 13.

The optical amplifier 13 amplifies the optical signal output from the optical multiplexer 12, and outputs the amplified optical signal to the transmission path constituted by the optical fibers 31a, 31b and 31c and the repeaters 32a and 32b.

A plurality of compensation coefficients for compensating for distortion of the transmit signal are previously stored in the compensation information table 14. Each compensation coefficient is calculated from parameters including the transmit optical signal waveform, the optical power, the amount of dispersion, the nonlinear optical constant of the optical fibers, and the system length (transmission path length), as stated above. In the example shown in FIG. 2, multiple compensation coefficients are calculated in advance by varying two of the parameters, namely, the optical power and the transmission path length, and the calculated compensation coefficients are stored in the compensation information table 14. For example, the optical power is varied to each nominal value (typical value in design, standard set value) of 80%, 85%, 90%, 95%, 100%, 105%, 110%, 115% and 120%, and with respect to each optical power level, compensation coefficients are calculated for distances 30%, 35%, 40%, 45%, 50%, 55%, 60%, 65% and 70% from the transmitting station 10, the calculated compensation coefficients being stored in the compensation information table 14.

Specifically, provided the transmit signal is E(t), the received signal transmitted with the nominal 95% optical power and received at the 30% distance of the transmission path, for example, can be derived by transmission simulation as $_{95\%,30\%}C[E(t)]$. This makes it possible to obtain a compensation coefficient $_{95\%,30\%}C^{-1}[]$, and also a compensation coefficient $_{95\%,40\%}C^{-1}[]$ at the nominal 95% optical power and at the 40% distance of the transmission path. Likewise, compensation coefficients $C^{-1}[]$ for the different optical power levels and the different transmission path lengths are obtained and stored in the compensation information table 14.

Where the optical power input to the transmission path is at the nominal 95%, the compensation coefficient $_{95\%,70\%}C^{-1}[]$, for example, may be applied to the transmit signal E(t) before transmission, in which case the original transmit signal E(t) is obtained at the 70% distance of the transmission path, because $_{95\%,70\%}C[_{95\%,70\%}C^{-1}[E(t)]]=E(t)$. In this case, although the transmit signal again undergoes distortion over the rest 30% distance of the transmission path, the original transmit signal E(t) can be obtained at the receiving station 20 by subjecting the received signal to dispersion compensation corresponding to the remaining distance of the transmission path.

The optical fibers 31a, 31b and 31c transmit the optical signal therethrough. The repeaters 32a and 32b amplify the optical signal that has attenuated while traveling through the respective optical fibers 31a, 31b and 31c.

The receiving station 20 includes an optical amplifier 21, an optical demultiplexer 22, data receivers 23a, 23b, ..., 23n, a compensation information table 24, FEC (Forward Error Correction) units 25a, 25b, ..., 25n, and a compensation controller 26.

The optical amplifier 21 amplifies the optical signal received from the optical fiber 31c, and outputs the amplified optical signal to the optical demultiplexer 22.

The optical demultiplexer 22 demultiplexes the wavelength division-multiplexed optical signal into respective wavelengths, and outputs the demultiplexed optical signals to the respective data receivers 23a, 23b, ..., 23n.

Each of the data receivers 23a, 23b, , 23n converts the corresponding demultiplexed optical signal to an electrical signal.

When converting the optical signal to an electrical signal, the data receiver 23a carries out distortion compensation. The compensation information table 24 stores in advance compensation coefficients for compensating for distortion of the received signal. Using a suitable compensation coefficient stored in the compensation information table 24, the data receiver 23a performs distortion compensation on the received signal.

A plurality of compensation coefficients for compensating for distortion of the received signal are previously stored in the compensation information table 24. Each compensation coefficient is calculated from the parameters including the transmit optical signal waveform, the optical power, the amount of dispersion, the nonlinear optical constant of the optical fibers, and the transmission path length, as stated above. In the example of FIG. 2, multiple compensation coefficients are calculated in advance by varying the two parameters, namely, the optical power and the transmission path length, and the calculated compensation coefficients are stored in the compensation information table 24. For example, the optical power is varied to each nominal value of 80%, 85%, 90%, 95%, 100%, 105%, 110%, 115% and 120%, and with respect to each optical power level, compensation coefficients are calculated for the remaining distances 70%, 65%, 60%, 55%, 50%, 45%, 40%, 35% and 30% to the receiving station 20, the calculated compensation coefficients being stored in the compensation information table 24.

Specifically, provided that the transmit signal is E(t), the received signal transmitted with the nominal 95% optical power and received at the remaining 30% distance of the transmission path, for example, can be derived by the transmission simulation as $_{95\%,30\%}C[E(t)]$. This makes it possible to obtain a compensation coefficient $_{95\%,30\%}C^{-1}[]$, and also a compensation coefficient $_{95\%,40\%}C^{-1}[]$ at the nominal 95% optical power and at the remaining 40% distance of the transmission path. Likewise, compensation coefficients $C^{-1}[]$ for the different optical power levels and the different transmission path lengths are obtained and stored in the compensation information table 24.

Where the optical power input to the transmission path is at the nominal 95%, the compensation coefficient $_{95\%,70\%}C^{-1}[]$, for example, may be applied to the transmit signal E(t) before transmission, and in this case, the original transmit signal E(t) is obtained at the 70% distance of the transmission path, because $_{95\%,70\%}C[_{95\%,70\%}C^{-1}[E(t)]]=E(t)$. Although the transmit signal again undergoes a distortion of $_{95\%,30\%}C[E(t)]$ during the transmission over the rest 30% distance of the transmission path, the original transmit signal E(t) can be obtained at the receiving station 20 by applying the compensation coefficient $_{95\%,30\%}C^{-1}[]$ to the received signal (because $_{95\%,30\%}C^{-1}[]_{95\%,30\%}C[E(t)]=E(t)$ The FEC units 25a, 25b, ..., 25n correct errors in the received electrical signals obtained through conversion by the respective data receivers 23a, 23b, 23n. The FEC unit 25a outputs information on error correction, for example, bit error rate, to the compensation controller 26.

The compensation controller 26 performs a control action such that the compensation coefficients are successively selected from among those stored in the compensation information tables 14 and 24 of the transmitting and receiving stations 10 and 20 and are output to the data transmitter 11a and the data receiver 23a, respectively.

At this time, the compensation controller 26 successively selects the compensation coefficients in such a manner that the optical power of the transmitting-side compensation coefficient is equal to that of the receiving-side compensation coefficient and also that the sum of the transmission distances of the transmitting- and receiving-side compensation coefficients is equal to 100%. For example, where the compensation coefficient selected at the transmitting side is $_{95\%,70\%}C^{-1}[]$, $_{95\%,30\%}C^{-1}[]$ is selected as the receiving-side compensation coefficient. The compensation controller 26 holds the error information provided by the FEC unit 25a with respect to each pair of successively selected compensation coefficients, and selects a pair of compensation coefficients with the least error rate, as a fixed pair. This permits the optical signal to be transmitted from the transmitting station 10 to the receiving station 20 while minimizing SPM-GVD.

The compensation coefficient is calculated with respect to the different optical power levels because the nominal optical power and the optical power actually transmitted through the transmission path occasionally differ from each other. For this reason, the compensation coefficients calculated for the different optical power levels are applied to the optical signal to be transmitted, to find the compensation coefficient matching the actual optical power for transmission of the optical signal.

Figure 3:
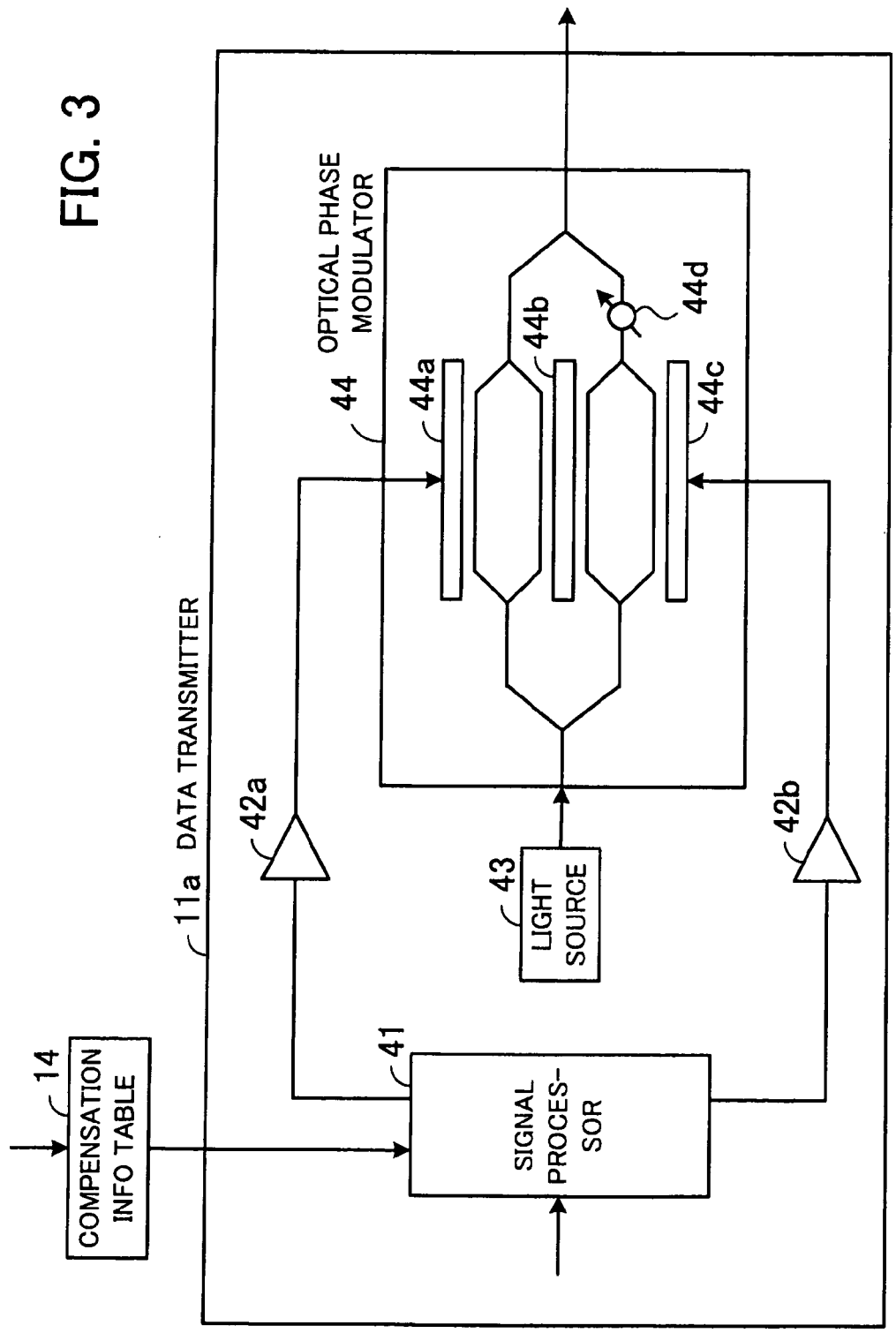
FIG. 3 is a block diagram of a data transmitter.

FIG. 3 is a block diagram of the data transmitter. As illustrated, the data transmitter 11a includes a signal processor 41, amplifiers 42a and 42b, a light source 43, and an optical phase modulator 44. The compensation information table 14 is also shown in the figure.

The signal processor 41 is input with digital data to be transmitted to the receiving station 20. The signal processor 41 separates the input digital data into I and Q signals, then applies the selected compensation coefficient in the compensation information table 14 to each of the signals (multiples each signal by the compensation coefficient), and outputs the resulting signals to the respective amplifiers 42a and 42b. The amplifiers 42a and 42b amplify the respective signals output from the signal processor 41, and output the amplified signals to the optical phase modulator 44.

The optical phase modulator 44 is also input with light from the light source 43. The light source 43 comprises, for example, an LD (Laser Diode). The optical phase modulator 44 modulates the light from the light source 43 by means of the electrical signals output from the amplifiers 42a and 42b, and outputs the modulated signal.

In the optical phase modulator 44, electrodes 44a and 44b constitute an I arm, and electrodes 44b and 44c constitute a Q arm. A phase adjuster 44d adjusts the phase of the Q arm so that the Q arm may have a phase difference of 90° with respect to the I arm.

Figure 4:
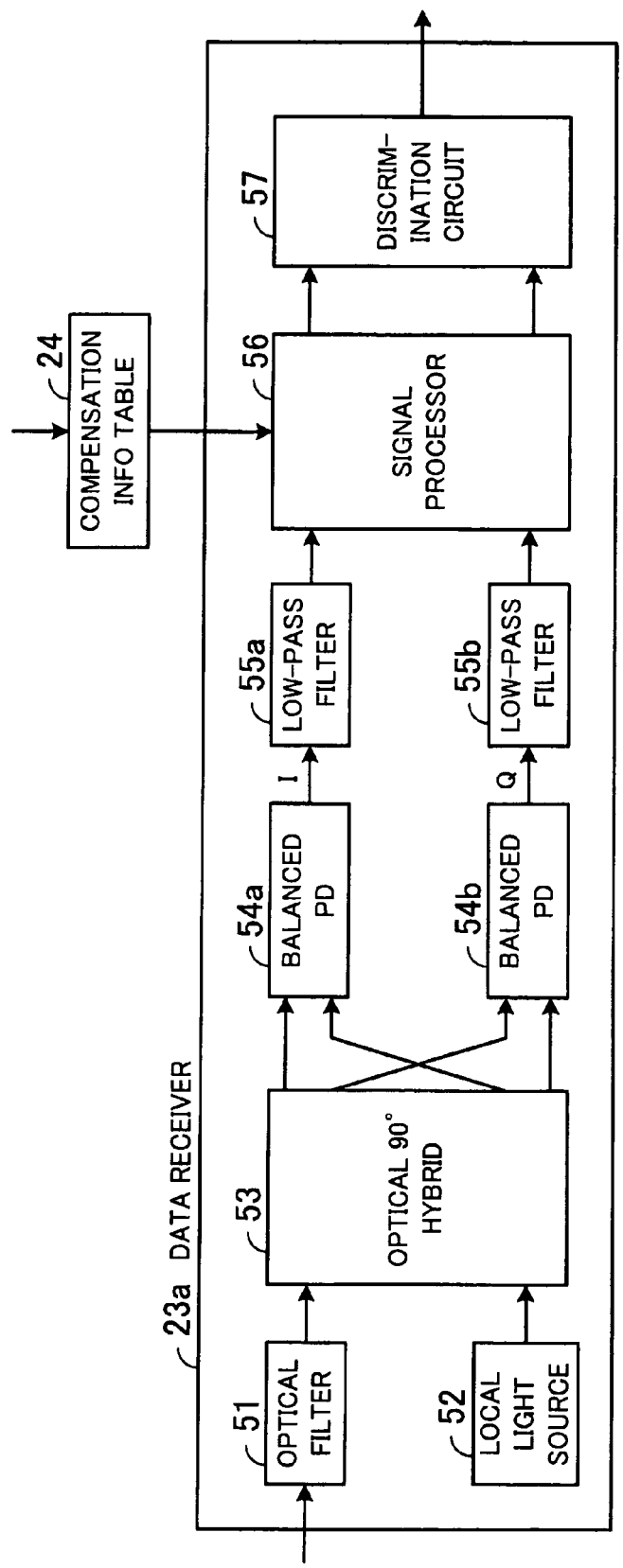
FIG. 4 is a block diagram of a data receiver.

FIG. 4 is a block diagram of the data receiver. As illustrated, the data receiver 23a includes an optical filter 51, a local light source 52, an optical 90° hybrid 53, balanced PDs (Photo Diodes) 54a and 54b, low-pass filters 55a and 55b, a signal processor 56, and a discrimination circuit 57. The compensation information table 24 is also shown in the figure.

The optical filter 51 is input with the demultiplexed optical signal. The optical filter 51 removes noise (unwanted wavelengths) from the input optical signal and outputs the resulting signal to the optical 90° hybrid 53.

The optical 90° hybrid 53 is formed using LiNbO$_3$, for example, and has therein a port for directly outputting the optical signal and a port for outputting the optical signal with its phase shifted by 90°. Also, the optical 90° hybrid 53 has a port for directly outputting light from the local light source 52 and a port for outputting the local light with its phase shifted by 90°. The optical 90° hybrid 53 combines the directly output optical signal with the directly output local light 52 and outputs the combined optical signal to the balanced PD 54a. Also, the optical 90° hybrid 53 combines the optical signal and the local light 52, both shifted in phase by 90°, and outputs the combined optical signal to the balanced PD 54b.

The balanced PD 54a converts the optical signal output from the optical 90° hybrid 53 to an electrical signal and outputs the obtained signal as the I signal. The balanced PD 54b converts the optical signal output from the optical 90° hybrid 53 to an electrical signal and outputs the obtained signal as the Q signal.

The low-pass filters 55a and 55b respectively remove high-frequency components from the I and Q signals output from the balanced PDs 54a and 54b, and output the resulting signals to the signal processor 56.

The signal processor 56 applies the selected compensation coefficient in the compensation information table 24 to each of the I and Q signals output from the respective low-pass filters 55a and 55b, and outputs the resulting signals to the discrimination circuit 57.

The discrimination circuit 57 is provided with CDR (Clock Data Recovery), for example, and recovers the digital data that the transmitting station 10 has transmitted, from the I and Q signals output from the signal processor 56.

FIG. 5 shows an exemplary data structure of the compensation information table in the transmitting station. The compensation coefficient is a complex number and carries two items of compensation information, namely, amplitude compensation data and phase compensation data. FIG. 5 shows only part of the data held by the compensation information table 14 in the transmitting station 10, that is, the compensation coefficient applied when the compensation ratio is 70:30 (70% distance from the transmitting station 10) and the optical power is at the nominal 100%, and the compensation coefficient applied when the compensation ratio is 70:30 and the optical power is at the nominal 105%.

Distortion compensation is carried out for every 3-bit block of the I and Q signals (hereinafter transmit signal), and the 3-bit transmit signal block is allotted amplitude compensation data "a$i,j,k,l$" and phase compensation data "b$i,j,k,l$". In the compensation information table 14 exemplified in FIG. 5, one bit is divided into eight parts for the purpose of compensation, and therefore, the 3-bit transmit signal block is allotted 24 items of compensation data.

In the compensation data, "i" represents the type of compensation ratio, and "1" indicates that the compensation data is for the compensation ratio 70:30. Also, "j" represents the type of optical power, and "1" indicates that the compensation data is for the nominal 100% optical power, while "2" indicates that the compensation data is for the nominal 105% optical power. Symbol "k" represents the type of bit pattern of the transmit signal. Since, in the illustrated example, the distortion compensation is performed with respect to every 3-bit block of the transmit signal, there exist seven types as the bit patterns of the 3-bit transmit signal block whose distortion is to be compensated. Specifically, "1" indicates that the compensation data is for the transmit signal with the bit pattern "000", "2" indicates that the compensation data is for the transmit signal with the bit pattern "001", and so on. Thus, "7" indicates that the compensation data is for the transmit signal with the bit pattern "111". Symbol "l" represents the position of allotment among the 24 parts into which the 3-bit transmit signal block is divided. For example, "1" indicates that the compensation data is for the first one of the 24 divided parts of the transmit signal, "2" indicates that the compensation data is for the second one of the 24 divided parts of the transmit signal, and so on. Thus, "24" indicates that the compensation data is for the 24th one of the 24 divided parts of the transmit signal.

In the field "a1,1,1,1" shown in FIG. 5, for example, "a1" indicates that the data stored in this field is amplitude compensation data applied to the compensation ratio 70:30, "1" (=j) indicates that the stored data is compensation data applied to the nominal 100% optical power, "1" (=k) indicates that the stored data is compensation data applied to the transmit signal with the bit pattern "000", and "1" (=l) indicates that the stored data is compensation data applied to the first one of the 24 divided parts of the transmit signal.

Figure 6:
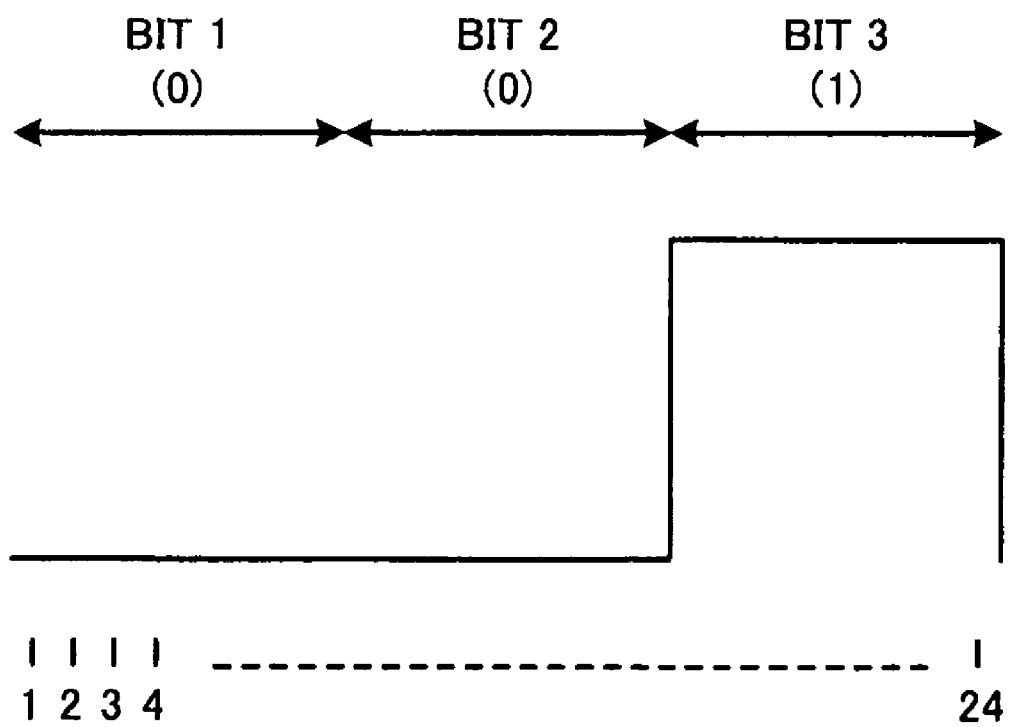
FIG. 6 illustrates distortion compensation.

FIG. 6 illustrates distortion compensation, wherein a waveform with the bit pattern "001" is shown as an example of the transmit signal whose distortion is to be compensated. The distortion compensation is carried out with respect to every 3-bit block of the transmit signal, as stated above. The 3-bit signal block is divided into 24 parts, and the thus-divided signal values are individually multiplied by the amplitude compensation data and the phase compensation data.

Let us suppose, for example, that the compensation controller 26 instructs the compensation information table 14 to output the compensation coefficient for the compensation ratio 70:30 and the nominal 105% optical power. In this case, if the transmit signal to be output from the signal processor 41 has the bit pattern "001", the compensation information table 14 outputs the amplitude compensation data stored in the field "a1,2,2,1" in FIG. 5, the amplitude compensation data stored in the field "a1,2,2,2", . . . , and the amplitude compensation data stored in the field "a1,2,2,24". Likewise, the compensation information table 14 outputs the corresponding phase compensation data. The signal processor 41 applies, to the bit pattern "001", the amplitude compensation data and phase compensation data output from the compensation information table 14, and outputs the resulting signal to the amplifier 42a or 42b.

The above explanation is based on the assumption that the compensation data is applied to every 3-bit block of the transmit signal. In cases where distortion exerts an influence over a longer bit pattern, however, the compensation information table 14 may be so configured as to hold compensation coefficients applicable to such a longer bit pattern.

FIG. 7 shows an exemplary data structure of the compensation information table in the receiving station. The compensation information table 24 in the receiving station 20 holds compensation data similar to that stored in the counterpart in the transmitting station 10, and therefore, detailed description thereof is omitted. In FIG. 7 in contrast with FIG. 5, the amplitude compensation data is shown as "mi,j,k,l" and the phase compensation data as "ni,j,k,l".

The received I and Q signals (hereinafter the received signal) have pattern dependence. Thus, the signal processor 56 of the receiving station 20 temporarily stores the received signal equivalent to three bits, for example, and applies, to the received signal, all patterns of the compensation coefficients corresponding to the compensation ratio and optical power instructed from the compensation controller 26 (the received signal is multiplied by each of the compensation coefficients). Then, the most likely signal pattern (signal pattern "0", "1" with maximum likelihood as the received signal) is output to the discrimination circuit 57.

In the above explanation, it is assumed that the compensation data is applied to every 3-bit block of the received signal. In cases where distortion exerts an influence over a longer bit pattern, the compensation information table 24 may be so configured as to hold compensation coefficients applicable to such a longer bit pattern.

Figure 8:
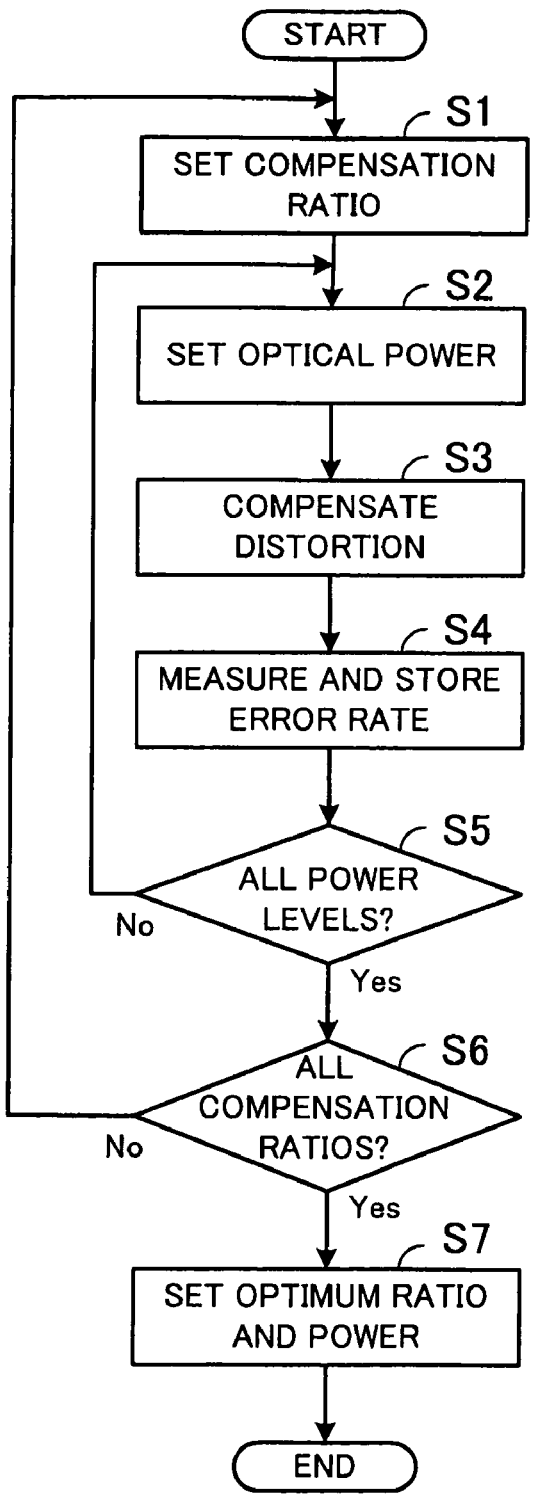
FIG. 8 is a flowchart illustrating operation of the optical transmission system.

FIG. 8 is a flowchart illustrating operation of the optical transmission system. The process explained below with reference to individual steps is executed when the optical transmission system is installed or upgraded or at regular intervals of time.

In Step S1, the compensation controller 26 selects a compensation ratio from among those set in the compensation information tables 14 and 24. For example, the compensation ratio is set which specifies that the distance from the transmitting station 10 and the distance to the receiving station 20 are both 50%.

Where Step S1 is executed following the branching Step S6, the compensation controller 26 sets a compensation ratio different from the previously selected one.

In Step S2, the compensation controller 26 selects an optical power level from among those set in the compensation information tables 14 and 24. For example, the nominal 100% optical power is selected. Where Step S2 is executed following the branching Step S5, the compensation controller 26 sets an optical power level different from the previously selected one.

Subsequently, in Step S3, the signal processors 41 and 56 compensate for distortion of the signal by using the compensation coefficients set in Steps S1 and S2.

In Step S4, the compensation controller 26 stores the error rate output from the FEC unit 25a, along with the optical power level and compensation ratio then selected, in a storage device such as RAM (Random Access Memory).

Then, in Step S5, the compensation controller 26 determines whether or not the error rate has been measured with respect to all optical power levels. If the error rate has not yet been measured with respect to all optical power levels, the process proceeds to Step S2. If the error rate has been detected for all optical power levels, the process proceeds to Step S6.

In Step S6, the compensation controller 26 determines whether or not the error rate has been measured with respect to all compensation ratios. If the error rate has not yet been measured with respect to all compensation ratios, the process proceeds to Step Si; if the error rate has been detected with respect to all compensation ratios, the process proceeds to Step S7.

Subsequently, in Step S7, the compensation controller 26 identifies the optical power and compensation ratio that provide the least error rate, from among those stored in the storage device. The compensation controller 26 then controls the compensation information tables 14 and 24 such that distortion of the signal is compensated with the use of the compensation coefficients corresponding to the identified optical power and compensation ratio.

In this manner, the transmitting and receiving stations 10 and 20 complementarily compensate for SPM-GVD induced distortion, whereby waveform distortion can be significantly reduced.

It is also possible to compensate for distortion caused on a long transmission path. For example, where only one of the transmitting and receiving stations 10 and 20 is configured to compensate for distortion of the signal transmitted over a long-distance transmission path, the amount of compensation is large, so that the waveform distortion cannot be satisfactorily reduced. On the other hand, where the distortion compensation is carried out complementarily by both the transmitting and receiving stations 10 and 20, it is possible to compensate for distortion caused over a long-distance transmission path as long as 9000 km, for example.

In the system shown in FIG. 2, only the data transmitter 11a and the data receiver 23a are configured to compensate for distortion. However, the other channels, namely, the data transmitters 11b, . . . , 11n and the data receivers 23b, . . . , 23n, may also be configured to perform distortion compensation.

In this case, each channel is provided with the compensation information tables and the compensation controller, like the data transmitter 11a and the data receiver 23a.

Also, in FIG. 2, the compensation controller 26 is provided in the receiving station 20 but may alternatively be provided in the transmitting station 10.

Further, in FIG. 2, the control signal from the compensation controller 26 is transmitted to the transmitting station 10 via a route different from the transmission path constituted by the optical fibers 31a, 31b and 31c and the repeaters 32a and 32b. Alternatively, the control signal may be transmitted through the transmission path constituted by the optical fibers 31a, 31b and 31c and the repeaters 32a and 32b.

In the above explanation, moreover, the compensation data tables are looked up to apply the compensation coefficients. Alternatively, the signal processors may be configured to calculate compensation data from the parameters including the transmit optical signal waveform, the optical power, the amount of dispersion, the nonlinear optical constant of the optical fibers, and the system length (transmission path length).

A second embodiment of the present invention will be now described in detail with reference to the drawings. In the first embodiment, SPM-GVD induced waveform distortion is compensated. According to the second embodiment, XPM-GVD induced waveform distortion is compensated. To this end, in the second embodiment, compensation data is calculated taking account of the influence of transmit signals on adjacent channels, and the calculated compensation data is applied to the optical signal.

Figure 9:
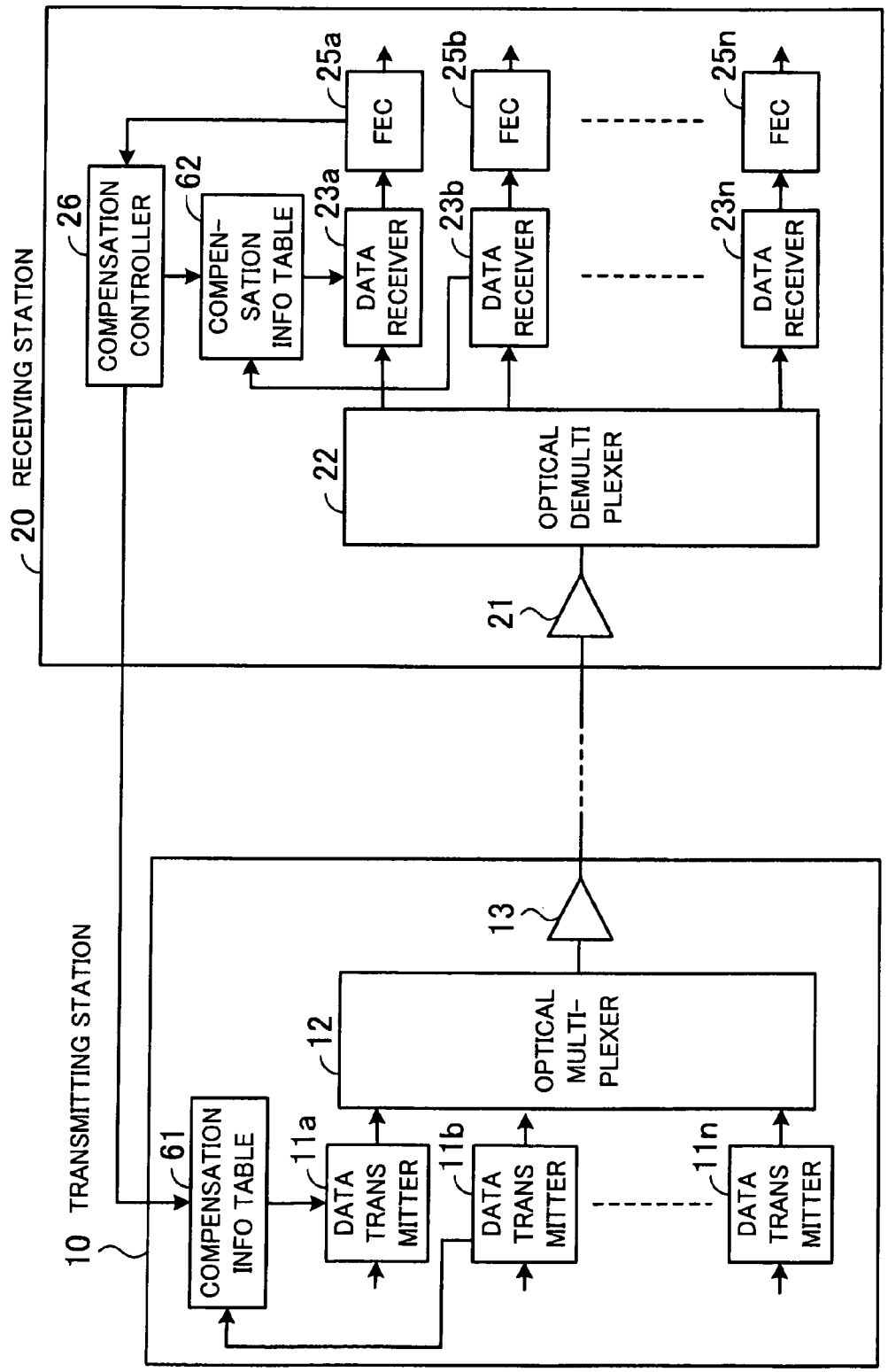
FIG. 9 illustrates an optical transmission system according to a second embodiment.

FIG. 9 illustrates an optical transmission system according to the second embodiment. In FIG. 9, like reference numerals refer to like elements also appearing in FIG. 2, and description of such elements is omitted. Also, in FIG. 9, the optical fibers 31a, 31b and 31c and the repeaters 32a and 32b shown in FIG. 2 are omitted.

A compensation information table 61 holds compensation data for compensating for distortion of the signal waveform of the data transmitter 11a caused under the influence of the signal input to the channel (data transmitter 11b) adjacent to the data transmitter 11a.

For example, the compensation information table 61 stores amplitude compensation data and phase compensation data that are used to compensate for distortion of the signal waveform of the data transmitter 11a when the signal input to the data transmitter 11b, which is the channel adjacent to the data transmitter 11a, is "000". Likewise, the compensation information table 61 stores amplitude compensation data and phase compensation data that are used to compensate for distortion of the signal waveform of the data transmitter 11a when the signal input to the data transmitter 11b is "001", "010", . . . , and "111". These items of compensation data are stored with respect to each compensation ratio and each optical power level, as in the compensation information table 14 shown in FIG. 5.

The expression $_{ab}C^{-1}[]$ represents the compensation coefficient calculated for the signal on the channel "a" taking account of the influence of the signal on the channel "b". For example, in FIG. 9, let the data transmitters 11a, 11b, . . . , 11n be channels 1, 2, . . . , n, respectively. In this case, the compensation information table 61 in FIG. 9 stores the compensation coefficient $_{1-2}C^{-1}[]$ calculated for the signal on the channel 1 taking account of the influence of the signal on the channel 2.

The channel 2 is the only channel that is adjacent to the channel 1. Also, the channel n has only one adjacent channel, namely, the channel n-1. Each of the other channels has two adjacent channels. For example, the channels 1 and 3 are adjacent to the channel 2. Thus, where XPM-GVD induced distortion of the signal on the channel 2 is to be compensated, compensation coefficients $_{2-1}C^{-1}[]$ and $_{2-3}C^{-1}[]$ are stored in the compensation information table 61. Provided that the data to be transmitted through the channel 2 is E(t), the data transmitter 11b performs distortion compensation $(_{2-1}C^{-1}[]+_{2-3}C^{-1}[])$ (E(t)) on the data and then transmits the resulting data to the receiving station 20.

Like the compensation information table 61, a compensation information table 62 stores the compensation coefficient $_{1-2}C^{-1}[]$. Thus, the data receiver 23a applies the compensation coefficient $_{1-2}C^{-1}[]$ to the received signal to thereby compensate for distortion.

The data receivers associated with the channels other than the channels 1 and n each compensate for waveform distortion of the received signal on the basis of the compensation coefficients of the two adjacent channels.

Let us suppose that the data receiver 23b (channel 2), for example, compensates for waveform distortion of the received signal. In this case, the compensation information table 62 has the compensation coefficients $_{2-1}C^{-1}[]$ and $_{2-3}C^{-1}[]$ stored therein, like the compensation information table 61 in the transmitting station 10. The data receiver 23b applies the sum of the compensation coefficients, $_{2-1}C^{-1}[]+_{2-3}C^{-1}[]$, to the received signal to thereby compensate for the waveform distortion.

In the optical transmission system shown in FIG. 9, XPM-GVD induced distortion of the channel 1 alone is compensated, but the system may be so configured as to compensate for XPM-GVD induced distortions of all channels. In this case, the compensation information tables 61 and 62 individually store the compensation coefficients expressed by $_{N-(N+1)}C^{-1}[]$ and $_{(N+1)-N}C^{-1}[]$ (where N is an integer equal to or greater than "1"). Also, where the expression P(i,j) represents compensation adjustment from the channel "j" to the channel "i", the compensation adjustment is successively carried out in the order: P(1,2), P(2,1), P(2,3), P(3,2), P(3,4), . . . , P(N,N+1), and P(N+1,N).

Figure 10:
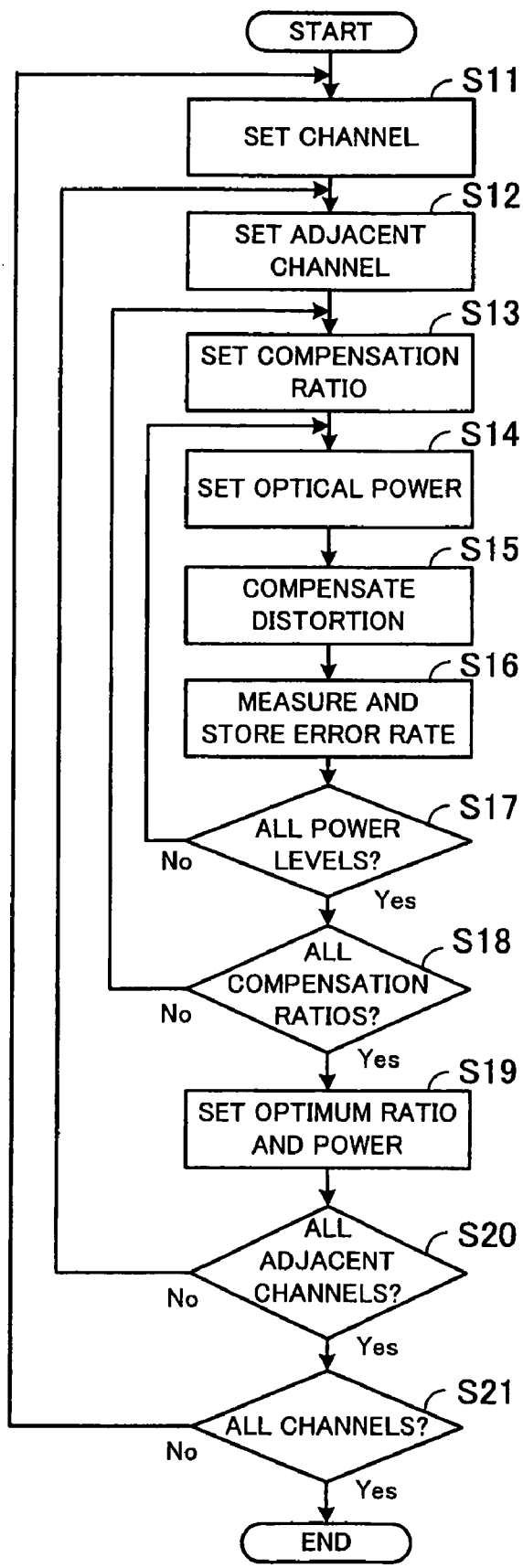
FIG. 10 is a flowchart illustrating operation of the optical transmission system.

FIG. 10 is a flowchart illustrating operation of the optical transmission system. XPM-GVD is dependent on the state of polarization relative to adjacent channels and thus varies with time. Accordingly, the process explained below with reference to individual steps is executed in the transmitting and receiving stations 10 and 20 at regular intervals of time.

First, in Step S11, the compensation controller 26 selects a channel whose XPM-GVD distortion compensation is to be adjusted. For example, the channel 1 is selected first. Where Step S11 is executed again following the branching Step S21, the channel to be selected is changed to the channel 2, the channel 3, and so on.

In Step S12, the compensation controller 26 selects an adjacent channel from among those set in the compensation information tables 61 and 62. For example, where the channel 1 has been set, the compensation coefficient associated with the adjacent channel 2 is selected, and where the channel 2 has been set, the compensation coefficients associated with the adjacent channels 1 and 3 are selected.

Then, in Step S13, the compensation controller 26 selects a compensation ratio from among those set in the compensation information tables 61 and 62. For example, the compensation ratio is set which specifies that the distance from the transmitting station 10 and the distance to the receiving station 20 are both 50%.

Where Step S13 is executed following the branching Step S18, the compensation controller 26 sets a compensation ratio different from the previously selected one.

In Step S14, the compensation controller 26 selects an optical power level from among those set in the compensation information tables 61 and 62. For example, the nominal 100% optical power is selected. Where Step S14 is executed following the branching Step S17, the compensation controller 26 sets an optical power level different from the previously selected one.

Subsequently, in Step S15, the signal processors 41 and 56 compensate for distortion of the signal by using the compensation coefficients set in Steps S13 and S14.

In Step S16, the compensation controller 26 stores the error rates output from the FEC units 25a, 25b, 25n, along with the optical power level and compensation ratio then selected, in a storage device such as RAM.

Then, in Step S17, the compensation controller 26 determines whether or not the error rate has been measured with respect to all optical power levels. If the error rate has not yet been measured with respect to all optical power levels, the process proceeds to Step S14. If the error rate has been detected for all optical power levels, the process proceeds to Step S18.

In Step S18, the compensation controller 26 determines whether or not the error rate has been measured with respect to all compensation ratios. If the error rate has not yet been measured with respect to all compensation ratios, the process proceeds to Step S13. If the error rate has been measured with respect to all compensation ratios, the process proceeds to Step S19.

Subsequently, in Step S19, the compensation controller 26 identifies the optical power and compensation ratio that provide the least error rate, from among those stored in the storage device. The compensation controller 26 then controls the compensation information tables 61 and 62 such that distortion of the signal is compensated with the use of the compensation coefficients corresponding to the identified optical power and compensation ratio.

In Step S20, the compensation controller 26 determines whether or not the adjustment for all adjacent channels has been completed. For example, where the channel 2 is being adjusted, it is determined whether or not the adjustment taking account of the influence of the channels 1 and 3 has been completed. If the adjustment with respect to all adjacent channels has been completed, the process proceeds to Step S21; if the adjustment with respect to all adjacent channels is not completed yet, the process proceeds to Step S12.

Then, in Step S21, the compensation controller 26 determines whether or not the adjustment has been carried out with respect to all channels. If the adjustment of all channels has not yet been completed, the process proceeds to Step S11; if the adjustment of all channels has been completed, the process ends.

In this manner, the transmitting and receiving stations 10 and 20 complementarily compensate for XPM-GVD induced distortion, whereby waveform distortion can be significantly reduced.

It is also possible to compensate for distortion caused on a long transmission path. For example, where only one of the transmitting and receiving stations 10 and 20 is configured to compensate for distortion of the signal transmitted over a long-distance transmission path, the amount of compensation increases, so that the waveform distortion cannot be satisfactorily reduced. On the other hand, where the distortion compensation is carried out complementarily by both the transmitting and receiving stations 10 and 20, it is possible to compensate for distortion caused over a long-distance transmission path as long as, for example, 9000 km.

In the above example, when the distortion of a certain channel is compensated, the influence of immediately adjacent channels is taken into account. Alternatively, the distortion of a channel may be compensated taking account of the influence of more than two neighboring channels. In the case of compensating for XPM-GVD induced distortion of the channel 3, for example, the influence of the neighboring channels 1, 2, 4 and 5 may be taken into account for the distortion compensation. In this case, the compensation information tables 61 and 62 individually store the distortion compensation coefficients $_{3\text{-}1}C^{-1}[]$, $_{3\text{-}2}C^{1}$, $_{3\text{-}4}C^{-1}[]$ and $_{3\text{-}5}C^{-1}$, and the sum of the compensation coefficients, $_{3\text{-}1}C^{-1}[]+_{3\text{-}2}C^{-1}+_{3\text{-}4}C^{-1}[]+_{3\text{-}5}C^{-1}$, is applied to the signal.

Further, in the above explanation, the compensation data tables are looked up to apply the compensation coefficients. Alternatively, the signal processors may be configured to calculate compensation data from the parameters including the transmit optical signal waveform, the optical power, the amount of dispersion, the nonlinear optical constant of the optical fibers, and the system length (transmission path length).

It is also possible to combine the distortion compensations of the first and second embodiments. In this case, at the time of installation, for example, adjustment is made for both the SPM-GVD and XPM-GVD compensations. For the XPM-GVD compensation, the adjustment may be periodically performed. Further, when the routes are changed, for example, the SPM-GVD and XPM-GVD compensation adjustments may be made with respect to the corresponding channels.

A third embodiment of the present invention will be now described in detail. In the third embodiment, the signal to be transmitted is subjected to polarization division multiplexing.

Figure 11:
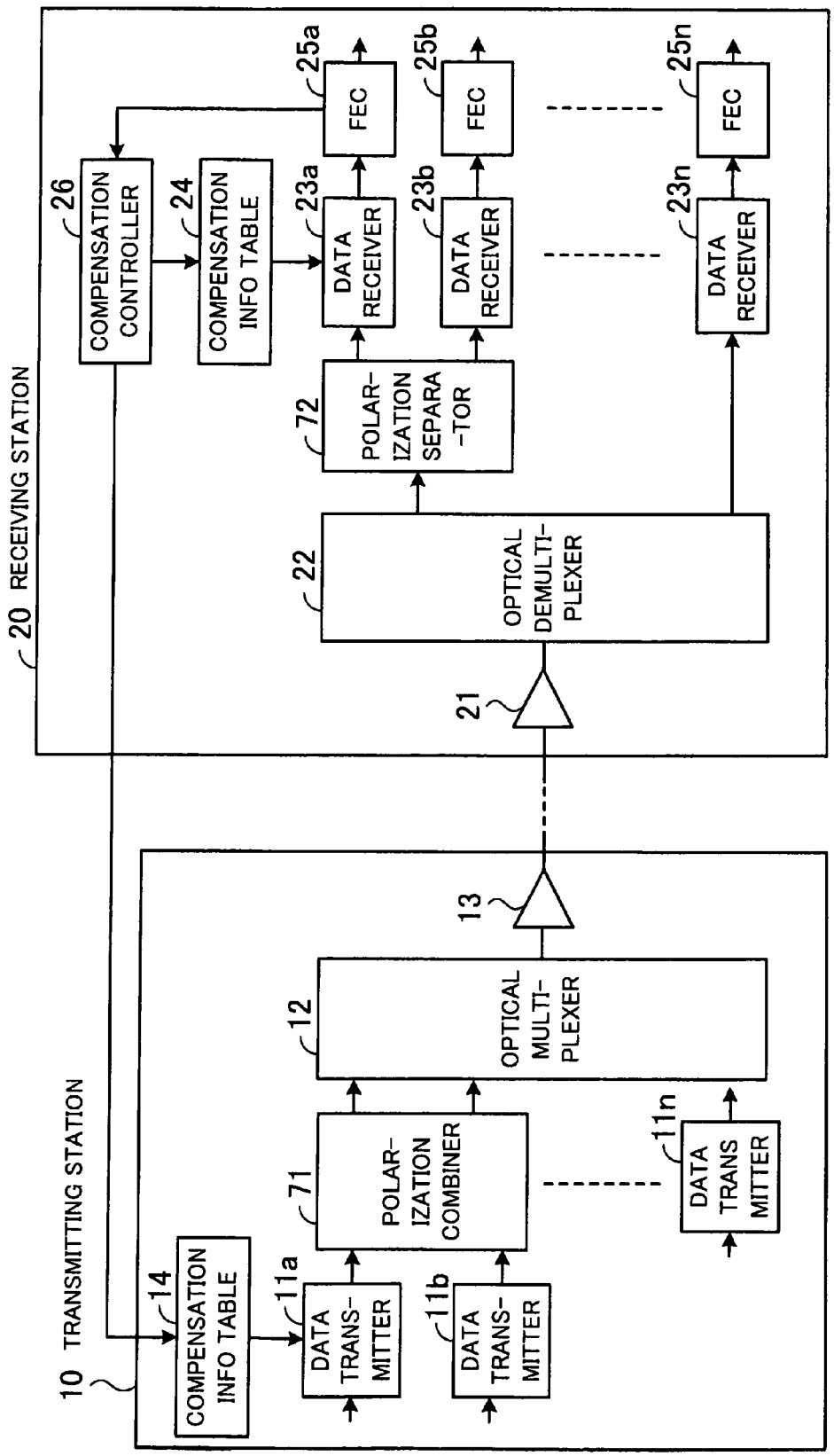
FIG. 11 illustrates an optical transmission system according to a third embodiment.

FIG. 11 illustrates an optical transmission system according to the third embodiment. In FIG. 11, like reference numerals refer to like elements also appearing in FIG. 2, and description of such elements is omitted. Also, in FIG. 11, the optical fibers 31a, 31b and 31c and the repeaters 32a and 32b shown in FIG. 2 are omitted.

As shown in FIG. 11, the transmitting station 10 additionally includes a polarization combiner 71, and the receiving station 20 additionally includes a polarization separator 72.

The polarization combiner 71 combines the optical signals output from the data transmitters 11a and 11b such that their polarizations are orthogonal to each other. The optical signals from the data transmitters 11a and 11b have an identical wavelength. Namely, the polarization combiner 71 combines the two modulating signals of an identical wavelength together with their polarizations orthogonalized, thereby making good use of the signal bandwidth.

The polarization separator 72 separates the demultiplexed optical signal from the optical demultiplexer 22 into respective polarization signals. The polarization separator 72 comprises, for example, a λ/4 plate and a λ/2 plate. Alternatively, the polarization separator 72 may be constituted by a Faraday rotator. The thus-separated optical polarization signals are output to the respective data receivers 23a and 23b, where the original data is recovered by demodulation.

Thus, also in the optical transmission system employing polarization division multiplexing, waveform distortion can be appropriately compensated.

In the above example, only the optical signals from the data transmitters 11a and 11b are subjected to polarization division multiplexing, but the optical signals from the other data transmitters may also be similarly subjected to polarization division multiplexing by using polarization combiners 71, like the data transmitters 11a and 11b. In this case, the other data receivers than the data receivers 23a and 23b in the receiving station 20 are associated with polarization separators 72 each adapted to separate the optical signal into respective polarization signals.

Also, in the system shown in FIG. 11, the optical signals from the data transmitters 11a and 11b are subjected to polarization orthogonalization, but the output of the optical multiplexer 12 may alternatively be polarization-orthogonalized. For example, an optical signal group and another optical signal group may be separately subjected to wavelength division multiplexing, and the resulting multiplexed optical signals may be further multiplexed by polarization orthogonalization. At the receiving station 20, the received optical signal is demultiplexed into respective polarization signals, each of which is further subjected to wavelength demultiplexing.

Whether the received polarization signal is a required one or not may be determined on the basis of frame information. Alternatively, at the transmitting side, a low-frequency signal may be superimposed on the intensity of the optical signal, and at the receiving side, the superimposed signal may be detected for the purpose of discrimination.

Also, in the above example, polarization division multiplexing is applied to the optical transmission system of the first embodiment but is equally applicable to the optical transmission system of the second embodiment. Further, polarization division multiplexing can be applied to an optical transmission system constructed by combining the optical transmission systems of the first and second embodiments.

With the disclosed systems, waveform distortion of optical signals can be efficiently compensated.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical transmission system for transmitting a wavelength division-multiplexed optical signal, the system comprising:
    a transmitting station including:
        a first storage to store a plurality of sets of transmitting-side distortion compensation coefficients which have respectively been calculated with a plurality of different compensation ratios each representing a ratio of length between first and second sections of transmission path of the optical signal,
        a first processor that is operative to select one of the sets of transmitting-side distortion compensation coefficients and perform distortion compensation on the optical signal based on the selected set of transmitting-side distortion compensation coefficients for the first section of the transmission path, and
        a transmitter to output, to the transmission path, the optical signal on which the distortion compensation has been performed by the first processor; and
    a receiving station including:
        a receiver to receive the optical signal from the transmission path,
        a second storage to store a plurality of sets of receiving-side distortion compensation coefficients which have respectively been calculated with the plurality of different compensation ratios, and
        a second processor that is operative to select one of the sets of receiving-side distortion compensation coefficients and perform distortion compensation on the optical signal received by the receiver, based on the selected set of receiving-side distortion compensation coefficients for the second section of the transmission path.

2. The optical transmission system according to claim 1, wherein:
    the plurality of sets of transmitting-side distortion compensation coefficients, as well as the plurality of sets of receiving-side distortion compensation coefficients, are calculated by setting different points at which the transmission path is divided into the first and second sections.

3. The optical transmission system according to claim 2, wherein the receiving station further includes an error detector to detect an error in the optical signal whose distortion has been compensated by the second processor.

4. The optical transmission system according to claim 3, wherein one of the transmitting and receiving stations further includes a compensation controller to store error detection results obtained by the error detector with the different compensation ratios, and select one of the different compensation ratios in accordance with the stored error detection results.

5. The optical transmission system according to claim 2, wherein the first storage and second storage store a plurality of sets of transmitting- and receiving-side distortion compensation coefficients which have respectively been calculated with different optical power levels of the optical signal, in combination with the different compensation ratios.

6. The optical transmission system according to claim 1, wherein the transmitting- and receiving-side distortion compensation coefficients are coefficients for compensating for waveform distortions caused on the transmission path due to self phase modulation of the optical signal.

7. The optical transmission system according to claim 1, wherein the transmitting- and receiving-side distortion compensation coefficients are coefficients for compensating for waveform distortions caused on the transmission path due to cross phase modulation of the optical signal.

8. The optical transmission system according to claim 1, wherein:
    the transmitting station further includes a polarization combiner to multiplex polarizations of optical signals whose distortions have been compensated by the first processor, and
    the receiving station further includes a polarization separator to demultiplex the optical signal received by the receiver into polarization signals, and output the polarization signals to the second processor.

* * * * *